United States Patent
Sunderrajan et al.

(10) Patent No.: US 11,821,748 B2
(45) Date of Patent: Nov. 21, 2023

(54) PROCESSING APPARATUS AND METHOD FOR DETERMINING ROAD NAMES

(71) Applicant: GRABTAXI HOLDINGS PTE. LTD., Singapore (SG)

(72) Inventors: Abhinav Sunderrajan, Singapore (SG); Jagannadan Varadarajan, Singapore (SG); Robinson Immanuel Kudali, Singapore (SG); Xiaocheng Huang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/921,830

(22) PCT Filed: Jun. 3, 2020

(86) PCT No.: PCT/SG2020/050320
§ 371 (c)(1),
(2) Date: Oct. 27, 2022

(87) PCT Pub. No.: WO2021/246954
PCT Pub. Date: Dec. 9, 2021

(65) Prior Publication Data
US 2023/0118627 A1 Apr. 20, 2023

(51) Int. Cl.
*G01C 21/36* (2006.01)
*G01C 21/34* (2006.01)

(52) U.S. Cl.
CPC ..... *G01C 21/3673* (2013.01); *G01C 21/3476* (2013.01); *G01C 21/3682* (2013.01)

(58) Field of Classification Search
CPC ............ G01C 21/3673; G01C 21/3476; G01C 21/3682
See application file for complete search history.

(56) References Cited

U.S. PATENT DOCUMENTS

| 8,996,523 B1 | 3/2015 | Fisher |
| 9,008,953 B2 | 4/2015 | Ma et al. |

(Continued)

FOREIGN PATENT DOCUMENTS

| CN | 102538803 | 7/2012 |
| CN | 103884345 | 6/2014 |

(Continued)

OTHER PUBLICATIONS

Efentakis, et al. "Crowdsourcing turning restrictions for OpenStreetMap", Workshop Proceedings of the EDBT/ICDT, 2014 Joint Conference, Mar. 28, 2014, pp. 355-362.

(Continued)

*Primary Examiner* — Rami Khatib
(74) *Attorney, Agent, or Firm* — Buckley, Maschoff & Talwalkar LLC (57) ABSTRACT

A processing apparatus is provided, to, for each candidate point-of-interest of at least one candidate point-of-interest identified for association with a road in a network of roads for determining a name for the road, generate first data indicative of a relationship relating to a distance between the candidate point-of-interest and a road segment of the road, generate second data indicative of a relationship between the road segment and a projection of the candidate point-of-interest in a direction of the road segment, and, if the first and second relationships satisfy a first and second conditions for association respectively, generate data indicative of the candidate point-of-interest being an associated point-of-interest, process data corresponding to the associated point-of-interest to extract name data indicative of a road name associated with the associated point-of-interest, and generate, based on the name data, data indicative of the name for the road.

19 Claims, 4 Drawing Sheets

(56) References Cited

U.S. PATENT DOCUMENTS

| | | | | |
|---|---|---|---|---|
| 2003/0050756 A1* | 3/2003 | McGovern | ......... | G01C 21/3632 |
| | | | | 340/990 |
| 2009/0088971 A1 | 4/2009 | Currie et al. | | |
| 2013/0117389 A1* | 5/2013 | Yamada | ........... | G08G 1/096775 |
| | | | | 709/206 |
| 2014/0258293 A1* | 9/2014 | Wong | ................ | G01C 21/3679 |
| | | | | 707/737 |
| 2015/0377629 A1 | 12/2015 | Duan et al. | | |
| 2016/0371300 A1* | 12/2016 | Yamada | ........... | G08G 1/096716 |
| 2017/0205245 A1 | 7/2017 | Chiba | | |
| 2018/0052868 A1 | 2/2018 | Siris et al. | | |

FOREIGN PATENT DOCUMENTS

| | | |
|---|---|---|
| CN | 105224622 | 1/2016 |
| CN | 105893632 | 8/2016 |
| CN | 109086528 | 12/2018 |
| JP | 2013-134392 | 7/2013 |
| WO | WO-2016/008230 | 1/2016 |

OTHER PUBLICATIONS

International Preliminary Report on Patentability Chapter II for PCT App. No. PCT/SG2020/050320, dated Jul. 2, 2021, (27 pages).
Written Opinion of the International Preliminary Examining Authority for PCT App. No. PCT/SG2020/050320, dated Feb. 2, 2021, (5 pages).
International Search Report and Written Opinion for PCT App. No. PCT/SG2020/050320, dated Aug. 26, 2020, (9 pages).

* cited by examiner

PROCESSING APPARATUS AND METHOD FOR DETERMINING ROAD NAMES

TECHNICAL FIELD

The invention relates generally to the field of at least one of navigation, mapping and communications. One aspect of the invention relates to a processing apparatus for determining road names. Another aspect of the invention relates to a method for determining road names.

One aspect of the invention has particular, but not exclusive, applications to naming of roads in a network of roads and/or validation of road names.

BACKGROUND

Digital road networks, including OpenStreetMap (OSM), etc., have proliferated over the past few years due to the increasing availability of driver trajectories, satellite images and advances in computer vision. While some digital maps are proprietary, OSM is crowd sourced and free.

Digital road network graphs are associated with several attributes such as direction of travel (DoT), street names, turn restrictions, U-turns, complex traffic intersections, number of lanes, road types, toll roads, traffic lights etc. It is essential that the aforementioned road attributes are correct to ensure that the given map can be used for routing and navigation. The features should not only be correct but should be periodically maintained and validated to account for the addition of new roads, new traffic rules, temporary/permanent road closures, to ensure seamless and safe navigation capabilities.

SUMMARY

Aspects of the invention are as set out in the independent claims. Some optional features are defined in the dependent claims.

Implementation of the techniques disclosed herein may provide significant technical advantages. The techniques may enable navigation of traffic through a network of roads, by enabling names to be provided or validated for roads to ensure proper guidance to road users for navigating through the road network. Names may be determined for roads based on points-of-interest (POIs) associated with the roads. In the techniques disclosed herein, a reference to a "road" may include a reference to a street, a lane, an avenue, or the like.

Determining names for roads according to the techniques disclosed herein can potentially affect the processing load of the system or processing apparatus, by providing an approach employing a set of conditions in relation to the data available for one or more candidate points-of-interest, which, therefore, may speed up processing and reduce the processing burden on the processing apparatus for determining names for various roads.

In at least some implementations, the processing load for this system or processing apparatus may depend on one or more of the number of POI candidates, the conditions used for inferring the candidates and the text pre-processing steps after loading the map corresponding to the area of interest. Loading the map may be the most expensive step here. This may take several minutes (~2-5 mins). The next steps may take 30-60 sec.

In at least some implementations, the techniques may provide for a confidence indicator (or confidence score) to be computed for names that have been determined. Names whose associated confidence indicators satisfy a defined threshold may instil a higher degree of confidence in the names to be assigned for the corresponding roads.

In at least some implementations, the techniques disclosed herein may allow, based on at least one POI associated with a road, one or more of (i) determination of a name for the road, (ii) assigning of a name for the road, (iii) detection of a name for the road, or (iv) validation or verification of a name for the road.

In at least some implementations, the techniques disclosed herein allow names that have been determined to be annotated on the corresponding roads on digital maps. This may aid navigation for road users.

In at least some implementations, the techniques disclosed herein allow pre-processing (e.g., standardisation processing) for standardising certain parameters of the street names associated with POIs for determining road names. Such processing may allow names associated with POIs, which may be similar or equivalent to each other but otherwise may be presented differently, to be in readily recognised forms that effectively refer to the same name. Such pre-processing may, therefore, reduce the processing burden on the processing apparatus, which otherwise may be required to perform additional checks and validation steps, for example, involving processing data based on street level imagery and/or data obtained from users of transport-related services.

In an exemplary implementation, the functionality of the techniques disclosed herein may be implemented in software running on a handheld communications device, such as a mobile phone. The software which implements the functionality of the techniques disclosed herein may be contained in an "app"—a computer program, or computer program product—which the user has downloaded from an online store. When running on the, for example, user's mobile telephone, the hardware features of the mobile telephone may be used to implement the functionality described below, such as using the mobile telephone's transceiver components to establish the secure communications channel for determining road names.

BRIEF DESCRIPTION OF THE DRAWINGS

The invention will now be described, by way of example only, and with reference to the accompanying drawings in which.

DETAILED DESCRIPTION

Various embodiments may include techniques, which may include one or more systems and/or one or more methods, to discover one or more road attributes so as to provide an aid for routing and navigation, for example, from crowd sourced GPS (Global Positioning System) traces.

The techniques disclosed herein may make use of one or more of (i) statistical insights derived from large scale GPS trajectory data that may be in the possession of a service provider for, for example, transport-related services, (ii) map geometry models from internal maps (e.g., maps that may be available internally to or within a service provider) and open source map providers including Open Street Maps (OSM), (iii) application of artificial intelligence (AI/machine learning (ML) models on GPS traces along with several other road attributes, and (iv) multitude of sensor signals such as speed, bearing, inertial motion sensor based readings, etc.

The techniques may provide for one or more methods to (automatically) discover and/or predict and/or validate one or more road attributes that may be needed for routing and navigation, such as street or road names. This may be carried out by leveraging GPS traces obtained, for example, from millions of transport-related services (e.g., rides) along with artificial intelligence (AI), and machine learning (ML) methods, domain knowledge of the underlying map geometry and associative knowledge from points-of-interest (POIs) (e.g., buildings, landmarks, etc) that are on the road network of interest. For example, street names may be detected and/or validated from POIs that are on the road segments making up the road or street.

For example, the present techniques may enable determination of road names using information of one or more points-of-interest (POIs). The techniques may predict or suggest a road name, for example, for a road whose name may be missing or not made known (for example, on a map, e.g., an electronic or digital map), by using information corresponding to POIs that are associated with the road or the road segments making up the road. As a non-limiting example, while a road may have an official name, this name may not be known earlier, not publicly known, or not documented in digital maps, and the techniques disclosed herein may make use of the POIs on roads and the addresses of the POIS to infer or identify the road names. For example, the techniques disclosed herein may use the address fields from the POIs lying on road segments of a road to impute the road name. Generally, a road may be made up of one road segment or a plurality of road segments. POIs may include, but not limited to, pick-up locations (or origin locations) and drop-off locations (or destination locations) associated with transport-related services or transport services (e.g., ride-hailing transport services) provided or administered by service providers, landmarks, etc.

As service providers for transport-related services may have access to very rich POI information for pickups and/or drop-offs locations, the techniques disclosed herein may enable leveraging the POIs to detect or determine street names. Having POI information or a database of POIs, where most of the POIs may have corresponding near complete addresses, may enable existing street names to be verified, and also roads or ways which may not have been captured earlier to be named.

The techniques disclosed herein may include one or more of the following (i) detecting which road segment the POI belongs to or associated with by projecting the POI onto the nearest segment, (ii) using a statistical method to identify the POIs associated with the road segment and using the address information of the POIs to infer the road/street name, (iii) using machine learning (ML) model(s) to parse the addresses of the POI entities residing on the road segment of interest to understand which part denotes the street name, and (iv) using a voting mechanism to determine the confidence of the street name by leveraging the street names from multiple POIs on the same street or road.

Figure 1:
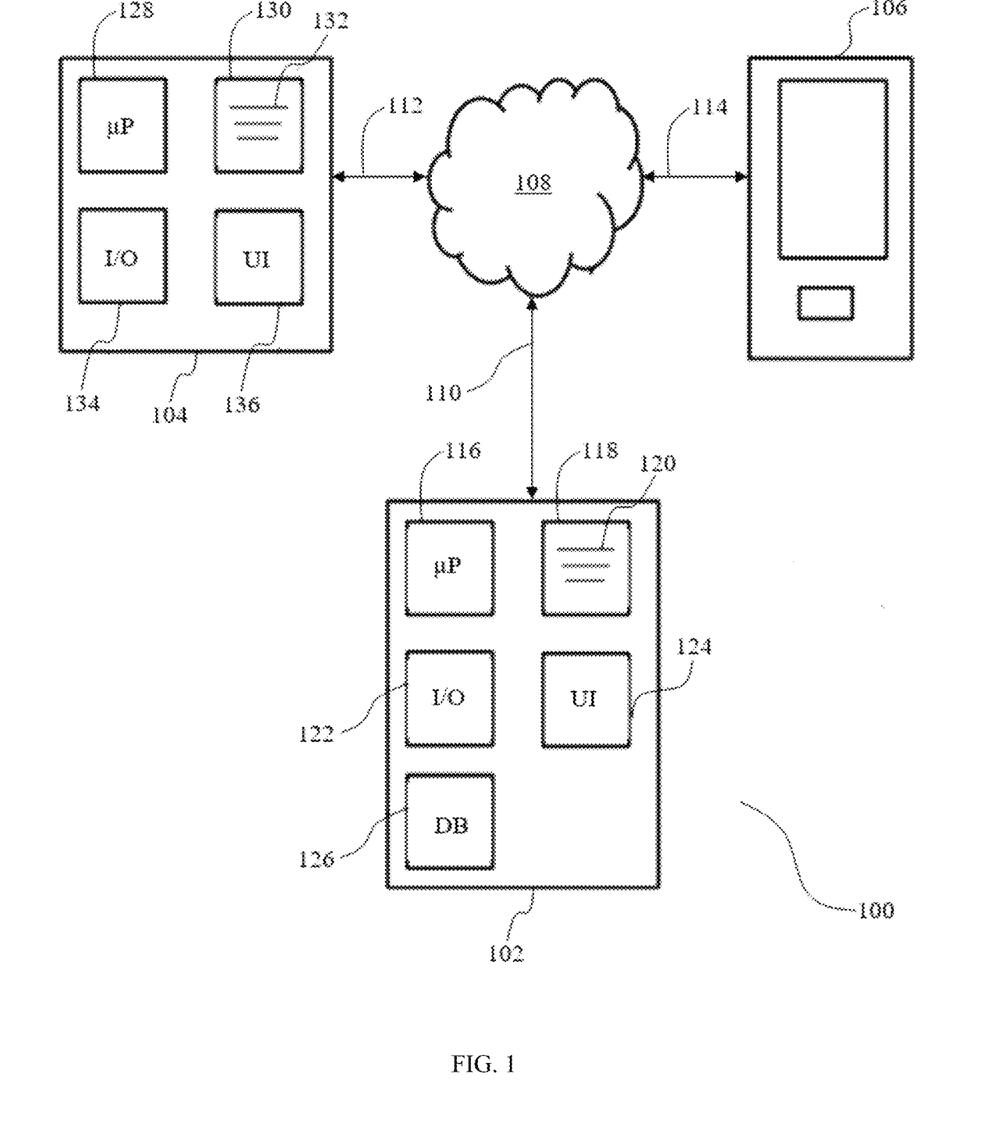
FIG. 1 is a schematic block diagram illustrating an exemplary communications system involving a communications server apparatus.

Referring first to FIG. 1, a communications system 100 is illustrated, which may be applicable in various embodiments. The communications system 100 includes a communications server apparatus 102, a first user (or client) communications device 104 and a second user (or client) communications device 106. These devices 102, 104, 106 are connected in or to the communications network 108 (for example, the Internet) through respective communications links 110, 112, 114 implementing, for example, internet communications protocols. The communications devices 104, 106 may be able to communicate through other communications networks, such as public switched telephone networks (PSTN networks), including mobile cellular communications networks, but these are omitted from FIG. 1 for the sake of clarity. It should be appreciated that there may be one or more other communications devices similar to the devices 104, 106.

The communications server apparatus 102 may be for determining road names.

The communications server apparatus 102 may be a single server as illustrated schematically in FIG. 1, or have the functionality performed by the communications server apparatus 102 distributed across multiple server components. In the example of FIG. 1, the communications server apparatus 102 may include a number of individual components including, but not limited to, one or more microprocessors (µP) 116, a memory 118 (e.g., a volatile memory such as a RAM (random access memory)) for the loading of executable instructions 120, the executable instructions 120 defining the functionality the server apparatus 102 carries out under control of the processor 116. The communications server apparatus 102 may also include an input/output (I/O) module 122 allowing the server apparatus 102 to communicate over the communications network 108. User interface (UI) 124 is provided for user control and may include, for example, one or more computing peripheral devices such as display monitors, computer keyboards and the like. The communications server apparatus 102 may also include a database (DB) 126, the purpose of which will become readily apparent from the following discussion.

The user communications device 104 may include a number of individual components including, but not limited to, one or more microprocessors (µP) 128, a memory 130 (e.g., a volatile memory such as a RAM) for the loading of executable instructions 132, the executable instructions 132 defining the functionality the user communications device 104 carries out under control of the processor 128. User communications device 104 also includes an input/output (I/O) module 134 allowing the user communications device 104 to communicate over the communications network 108. A user interface (UI) 136 is provided for user control. If the user communications device 104 is, say, a smart phone or tablet device, the user interface 136 may have a touch panel display as is prevalent in many smart phone and other handheld devices. Alternatively, if the user communications device 104 is, say, a desktop or laptop computer, the user interface may have, for example, one or more computing peripheral devices such as display monitors, computer keyboards and the like.

The user communications device 106 may be, for example, a smart phone or tablet device with the same or a similar hardware architecture to that of the user communications device 104.

Figure 2A:
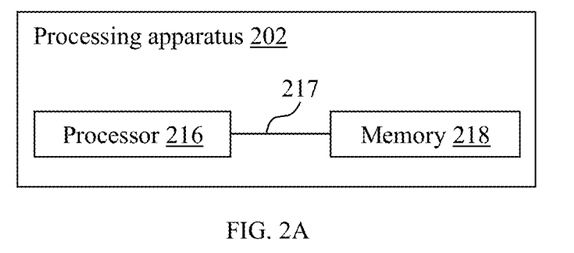
FIG. 2A shows a schematic block diagram illustrating a processing apparatus for determining road names.
Figure 2B:
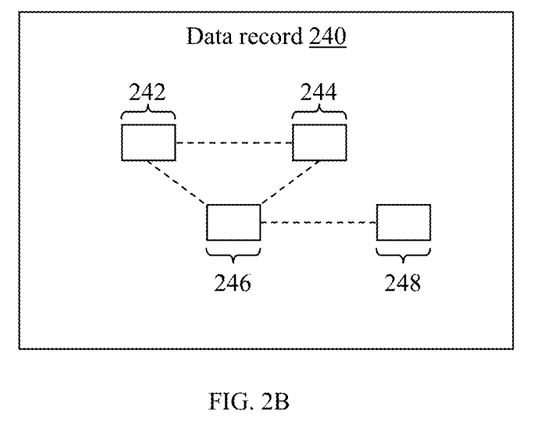
FIG. 2B shows a schematic block diagram illustrating a data record.

FIG. 2A shows a schematic block diagram illustrating a processing apparatus 202 for determining road names, while FIG. 2B shows a schematic block diagram illustrating a data record 240.

The processing apparatus 202 includes a processor 216 and a memory 218, where the processing apparatus 202 is configured, under control of the processor 216 to execute instructions in the memory 218 to, for each candidate point-of-interest of at least one candidate point-of-interest identified for association with a road in a network of roads for determining a name for the road, generate, in one or more data records 240, first data 242 indicative of a first relationship relating to a distance between the candidate point-of-interest and a road segment of the road, generate, in the one or more data records 240, second data 244 indicative of a second relationship between the road segment and a projection of the candidate point-of-interest in a direction of the road segment, and if the first relationship satisfies a first condition for association and the second relationship satisfies a second condition for association, generate, in the one or more data records 240, data 246 indicative of the candidate point-of-interest being an associated point-of-interest that is associated with the road, process, for each associated point-of-interest, data corresponding to the associated point-of-interest to extract name data indicative of a road name associated with the associated point-of-interest, and generate, in the one or more data records 240 and based on the name data, data 248 indicative of the name for the road. The processor 216 and the memory 218 may be coupled to each other (as represented by the line 217), e.g., physically coupled and/or electrically coupled.

In other words, there may be provided a processing apparatus 202 for determining road names. For each candidate point-of-interest of at least one candidate point-of-interest that is or has been identified for association with a road in a network of roads for determining a name for the road, the processing apparatus 202 may generate, in one or more data records 240, first data 242 indicative of a first relationship relating to a distance between the candidate point-of-interest and a road segment of the road. For example, the first relationship may relate to or may define the distance of the candidate point-of-interest relative to the road segment, or whether the distance between the candidate point-of-interest and the road segment satisfies a threshold, e.g., whether the candidate point-of-interest lies within a certain radius centred on the road segment.

For the each candidate point-of-interest, the processing apparatus 202 may further generate, in the one or more data records 240, second data 244 indicative of a second relationship between the road segment and a projection of the candidate point-of-interest in a direction of the road segment. For example, the second relationship may relate to or may define where the projection of the candidate point-of-interest is relative to the road segment, or whether the projection of the candidate point-of-interest lies on the road segment. The relationship in the projection of the candidate point-of-interest relative to the road segment may mean or may include a relationship in an orthogonal projection of the candidate point-of-interest in a direction of the road segment.

It should be appreciated that the first and second relationships are with respect to the same road segment of the road. The road segment may be the road segment nearest to the candidate point-of-interest.

In the context of various embodiments, a road may have or may be made up of one or more road segments, and at least two nodes. A road segment may be defined between two nodes of the road. Each node of the road may be assigned a (unique) node identifier (ID).

For the each candidate point-of-interest, if the first relationship satisfies a first condition for association and the second relationship satisfies a second condition for association, the processing apparatus 202 may further generate, in the one or more data records 240, data 246 indicative of the candidate point-of-interest being an associated point-of-interest that is associated with the road. In other words, if the first relationship and the second relationship satisfy the first and second conditions for association respectively, the candidate point-of-interest is defined as an associated point-of-interest.

The processing apparatus 202 may further process, for each associated point-of-interest, data corresponding to the associated point-of-interest to extract name data indicative of a road name associated with the associated point-of-interest (e.g., from or based on data indicative of an address of the associated point-of-interest). For example, the name data may be extracted from the address field (or data therein) of the associated point-of-interest.

The processing apparatus 202 may further generate, in the one or more data records 240 and based on the name data (of the each associated point-of-interest), data 248 indicative of the name for the road.

It should be appreciated that additional relationship(s) and/or condition(s) for association may be imposed, depending on requirement(s).

The data corresponding to the network of roads may be stored in the processing apparatus 202, e.g., in the memory 218, or the data corresponding to the network of roads may be stored in another location (e.g., in a server) and may be received by or accessible to the processing apparatus 202.

In the context of various embodiments, the data corresponding to the network of roads may include, but not limited to, data or information on at least one of a plurality of roads within the network, one or more road segments of each road, one or more nodes of each road, relationship between the roads (e.g., including any connection therebetween), geometrical layout of the network, direction of traffic on respective roads (e.g., including whether the roads may be roads for one-way traffic or bi-directional traffic), intersection nodes, traffic light arrangements, road classification (e.g., whether the roads are major or minor roads, residential roads, highways, etc.), dimensions of the roads (e.g., lengths, widths), names of the roads, data or information (e.g., names, addressed, etc.) on one or more points-of-interest (POIs) within the network, etc.

In the context of various embodiments, data corresponding to points-of-interest, including data corresponding to candidate points-of-interest and associated points-of-interest, may be part of or stored in a database. The data corresponding to the points-of-interest may be stored in the processing apparatus 202, e.g., in the memory 218, or the data corresponding to the points-of-interest may be stored in another location (e.g., in a server) and may be received by or accessible to the processing apparatus 202.

In the context of various embodiments, the data corresponding to each point-of-interest (e.g., candidate point-of-interest, associated point-of-interest) may include, but not limited to, data or information on one or more of a name of the point-of-interest, an address of the point-of-interest (including, for example, name data indicative of a road name associated with the point-of-interest), a location of the point-of-interest (e.g., in terms of its spatial coordinates, e.g., latitude and longitude), a distance of the point-ofinterest relative to a defined road or road segment, nature of the point-of-interest (e.g., whether it is an office building, a shopping mall, etc.), etc.

In the context of various embodiments, the one or more data records 240 may include one or more distance data fields, one or more projection data fields, one or more association data fields, and one or more name data fields. The processing apparatus 202 may generate, for or in the one or more distance data fields, the first data 242. The processing apparatus 202 may generate, for or in the one or more projection data fields, the second data 244. The processing apparatus 202 may generate, for or in the one or more association data fields, the data 246. The processing apparatus 202 may generate, for or in the one or more name data fields, the data 248.

In various embodiments, the data 248 indicative of the name for the road may be for communicating to road users (e.g., via (communications) devices of the road users) for indicating the name for the road In the context of various embodiments, the (communications) device of a road user may include, but not limited to, a smart phone, tablet, handheld/portable communications device, desktop or laptop computer, terminal computer, navigation device (including an in-vehicle navigation device), etc.

In the context of various embodiments, a candidate point-of-interest (POI) may have an address containing a road name associated with the candidate POI that defines its location. The candidate POI may also be defined by its location in terms of its spatial coordinates, e.g., latitude and longitude, and/or name.

In the context of various embodiments, a candidate point-of-interest (POI) may include, but not limited to, a building, a landmark, a place, a location, etc., including, for example, a pick-up (origin) location and/or a drop-off (destination) location for transport-related services (e.g., ride-hailing transport services, delivery services, logistics).

In the context of various embodiments, the one or more data records 240 may be associated with or accessible by the processing apparatus 202. The one or more data records 240 may be generated by the processing apparatus 202. The one or more data records 240 may be modified or updated by the processing apparatus 202. The one or more data records 240 may be stored at the processing apparatus 202, e.g., in the memory 218.

In various embodiments, the processing apparatus 202 may process data corresponding to or indicative of the network of roads to identify the at least one candidate point-of-interest (POI) for association with the road in the network for determining the name for the road.

In various embodiments, the first condition for association may define a threshold for a perpendicular distance between the candidate point-of-interest and the road segment and the first condition is satisfied if the perpendicular distance is equal to or less than the threshold. Accordingly, the threshold may define a maximum threshold for the perpendicular distance. As a non-limiting example, the threshold may be measured in meters, and may, for example, be 10 meters, or 5 meters. However, it should be appreciated that any suitable distance may be defined for the threshold.

Further, the second condition for association may define an orthogonal projection of the candidate point-of-interest in the direction of the road segment and the second condition is satisfied if the orthogonal projection intersects the road segment. In other words, the orthogonal projection of the candidate point-of-interest may lie on the road segment.

In various embodiments, the at least one candidate point-of-interest may include a plurality of candidate points-of-interest for defining a plurality of associated points-of-interest. For processing the data corresponding to the associated point-of-interest, the processing apparatus 202 may process, for each associated point-of-interest of the plurality of associated points-of-interest, data corresponding to the associated point-of-interest to extract name data indicative of a road name associated with the associated point-of-interest. If the road names associated with the plurality of associated points-of-interest include a plurality of different candidate road names, the processing apparatus 202 may further determine a number count of associated points-of-interest having a candidate road name, out of the plurality of different candidate road names, that occurs the highest number of times, and, for generating the data 248 indicative of the name for the road, generate, based on the name data indicative of the candidate road name that occurs the highest number of times, data 248 indicative of the name for the road. In this way, a majority vote may be taken to determine the name for the road.

In various embodiments, the processing apparatus 202 may process the data corresponding to the network of roads to identify the plurality of candidate points-of-interest for association with the road for defining the plurality of associated points-of-interest.

The processing apparatus 202 may further generate, in the one or more data records 240, data indicative of a confidence indicator (or confidence score) for the name for the road, compare the confidence indicator with a threshold, and, if the confidence indicator satisfies the threshold (e.g., the confidence indicator has a value that is equal to or higher than a value of the threshold), generate data indicative of validation (or verification) of the name for the road.

The road name whose confidence indicator is equal to or above the threshold may be annotated directly on a digital (or electronic) map having the road. Road names whose confidence indicators are below the threshold may be subjected to one or more further steps, e.g., manual verification or verification via crowd sourcing.

In the context of various embodiments, the confidence indicator may be determined by the formula, confidence indicator=log (max_votes)/(1+entropy), where, max_votes refers to the number count of the associated points-of-interest having the candidate road name that occurs the highest number of times, and, entropy refers to Shannon's entropy (for defining the uncertainty associated with the plurality of candidate road names). The confidence indicator is thus directly proportional to the "max_votes" and inversely proportional to the "entropy".

In various embodiments, prior to processing the data corresponding to the associated point-of-interest to extract the name data, the processing apparatus 202 may modify at least one part of the road name associated with the associated point-of-interest based on at least one standardisation processing, and generate modification data indicative of the road name with the at least one modified part, the modification data being included in the name data, and, for processing the data corresponding to the associated point-of-interest to extract the name data, the processing apparatus 202 may process the data to extract the name data including the modification data.

The at least one standardisation processing may include processing of abbreviations, and, for modifying the at least one part of the road name, the processing apparatus 202 may replace a non-abbreviated term in the road name with an abbreviated term corresponding to the non-abbreviated term, or replace an abbreviated term in the road name with a non-abbreviated term corresponding to the abbreviated term. The abbreviated term may be a common abbreviated term corresponding to the non-abbreviated term. As a non-limiting example, the non-abbreviated term "street" may be replaced by its corresponding abbreviated term "st.", "st", or "St.", or the like, or vice versa.

The at least one standardisation processing may include processing of numbers, and, for modifying the at least one part of the road name, the processing apparatus 202 may replace a Roman numeral in the road name with a digit corresponding to the Roman numeral. As a non-limiting example, the Roman numeral "V" may be replaced by its corresponding digit "5".

The at least one standardisation processing may include processing of punctuations, and, for modifying the at least one part of the road name, the processing apparatus 202 may remove at least one punctuation in the road name.

The at least one standardisation processing may include processing of number substrings, and, for modifying the at least one part of the road name, the processing apparatus 202 may remove at least one number substring in the road name, the at least one number substring including at least one of a house number or a unit number. The term "house number" may refer to the unique number assigned to a building or landmark in a street or area to distinguish it from other buildings or landmarks on the same street or area, as well as make it easier to locate a particular building or landmark. As a non-limiting example, such a house number may include a numerical number that may be positioned before or after the road name in the address, and, in some cases, may be preceded by a word "Number", "number", "No.", "no." or the like. Examples may include "52 Street A" (52 being the house number), or "Street X No. 28" (No. 28 referring to the house number), or the like, etc. The term "unit number" may refer to the unique number assigned to a particular unit (e.g., an office space, an apartment, an area, etc.) within a building or landmark to distinguish it from other units within the building or landmark, as well as make it easier to locate a particular unit. As a non-limiting example, such a unit number may include at least one of (i) one or more numerical number, (ii) one or more symbols, or (iii) one or more words or their acronyms. Examples may include "02-07", "#05-08", "Floor 3 Unit 6", or "Fl. 8 Unit 7", or the like, etc.

The at least one standardisation processing may include processing of equivalent terms, and, for modifying the at least one part of the road name, the processing apparatus 202 may replace a word in the road name with an equivalent term corresponding to the word, the word and the equivalent term having a similar meaning. As a non-limiting example, the words/terms "road" and street" may be equivalent to each other. As a further non-limiting example, the word and the equivalent term may be in different languages.

The processing apparatus may further process data indicative of a digital (or electronic) map representative of the network of roads and the data 248 indicative of the name for the road for displaying the digital map with the name for the road. The data indicative of the digital map may be stored in the processing apparatus 202, e.g., in the memory 218, or the data indicative of the digital map may be stored in another location and may be received by or accessible to the processing apparatus 202.

Figure 2C:
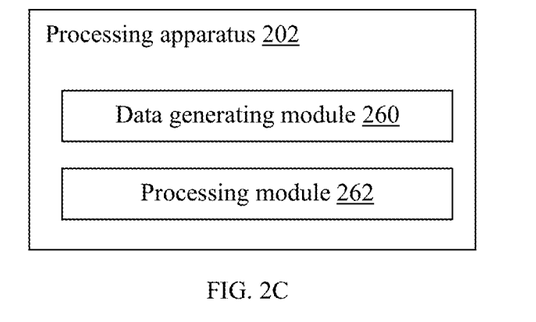
FIG. 2C shows a schematic block diagram illustrating architecture components of the processing apparatus of FIG. 2A.

FIG. 2C shows a schematic block diagram illustrating architecture components of the processing apparatus 202. That is, the processing apparatus 202 may further include a data generating module 260 to generate the respective data 242, 244, 246, 248 (see FIG. 2B) and a processing module 262 to process the data corresponding to the associated point-of-interest to extract name data indicative of a road name associated with the associated point-of-interest.

In the context of various embodiments, the processing apparatus 202 may be or may include a communications server apparatus, and may, for example, be as described in the context of the server device 102 (FIG. 1). The processor 216 may be as described in the context of the processor 116 (FIG. 1) and/or the memory 218 may be as described in the context of the memory 118 (FIG. 1).

In the context of various embodiments, the processing apparatus 202 may be a single server, or have the functionality performed by the processing apparatus 202 distributed across multiple apparatus components.

In the context of various embodiments, the processing apparatus 202 may be or may include a (communications) device of a road user.

Figure 2D:
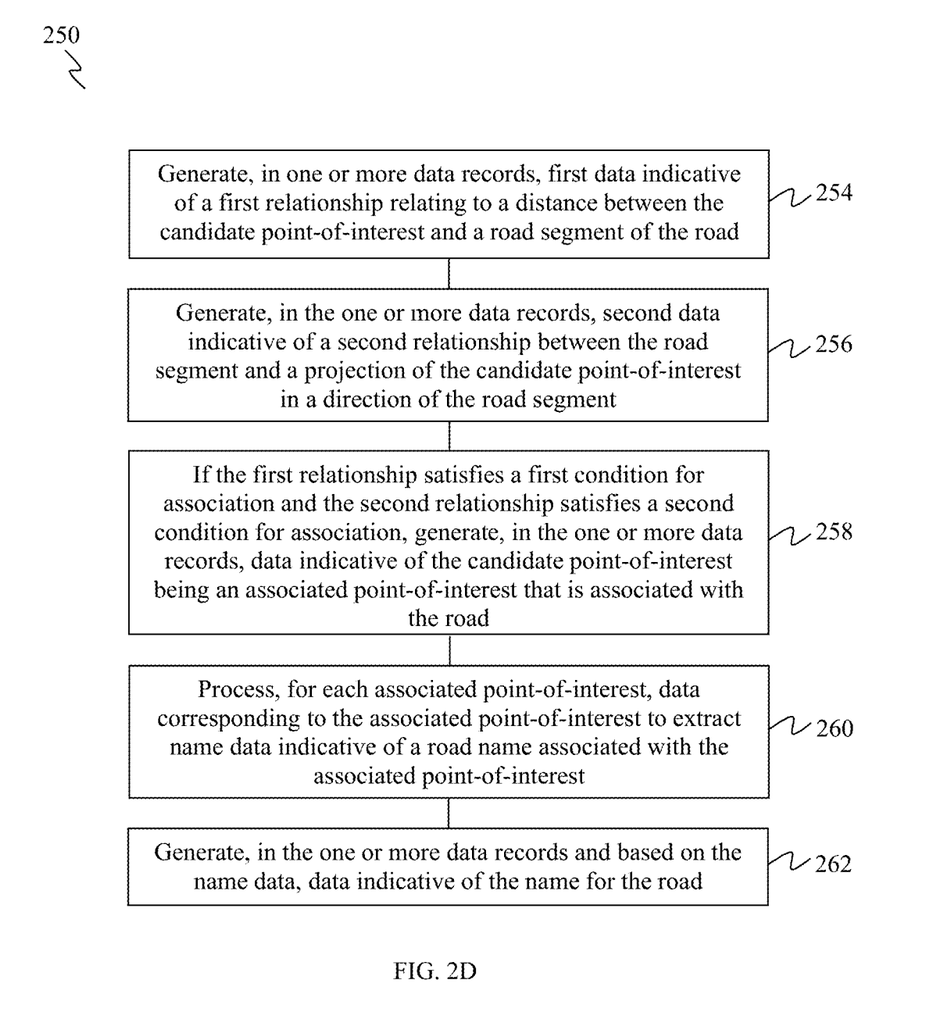
FIG. 2D shows a flow chart illustrating a method for determining road names.

FIG. 2D shows a flow chart 250 illustrating a method for determining road names.

For each candidate point-of-interest of at least one candidate point-of-interest identified for association with a road in a network of roads for determining a name for the road, at 254, first data indicative of a first relationship relating to a distance between the candidate point-of-interest and a road segment of the road is generated in one or more data records, at 256, second data indicative of a second relationship between the road segment and a projection of the candidate point-of-interest in a direction of the road segment is generated in the one or more data records, and, at 258, if the first relationship satisfies a first condition for association and the second relationship satisfies a second condition for association, data indicative of the candidate point-of-interest being an associated point-of-interest that is associated with the road is generated in the one or more data records.

At 260, for each associated point-of-interest, data corresponding to the associated point-of-interest is processed to extract name data indicative of a road name associated with the associated point-of-interest.

At 262, based on the name data, data indicative of the name for the road is generated in the one or more data records.

In various embodiments, prior to 254, data corresponding to the network of roads may be processed to identify the at least one candidate point-of-interest for association with the road in the network for determining the name for the road.

In various embodiments, the first condition for association may define a threshold for a perpendicular distance between the candidate point-of-interest and the road segment and the first condition is satisfied if the perpendicular distance is equal to or less than the threshold, and, the second condition for association may define an orthogonal projection of the candidate point-of-interest in the direction of the road segment and the second condition is satisfied if the orthogonal projection intersects the road segment.

In various embodiments, the at least one candidate point-of-interest may include a plurality of candidate points-of-interest for defining a plurality of associated points-of-interest, and, at 260, for each associated point-of-interest of the plurality of associated points-of-interest, data corresponding to the associated point-of-interest may be processed to extract name data indicative of a road name associated with the associated point-of-interest. If the road names associated with the plurality of associated points-of-interest include a plurality of different candidate road names, a number count of associated points-of-interest having a candidate road name, out of the plurality of different candidate road names, that occurs the highest number of times may be determined, and, at 262, based on the name data indicative of the candidate road name that occurs the highest number of times, data indicative of the name for the road may be generated.

In various embodiments, prior to 254, the data corresponding to the network of roads may be processed to identify the plurality of candidate points-of-interest for association with the road for defining the plurality of associated points-of-interest.

The method may further include generating, in the one or more data records, data indicative of a confidence indicator for the name for the road, comparing the confidence indicator with a threshold, and, if the confidence indicator satisfies the threshold, generating data indicative of validation of the name for the road. The confidence indicator may be determined by the formula described above.

In various embodiments, prior to 260, the method may include modifying at least one part of the road name associated with the associated point-of-interest based on at least one standardisation processing, and, generating modification data indicative of the road name with the at least one modified part, the modification data being included in the name data, and, at 260, the method may include processing the data to extract the name data including the modification data.

The at least one standardisation processing may include at least one of processing of abbreviations, processing of numbers, processing of punctuations, processing of number substrings, or processing of equivalent terms, as described above.

The method may further include processing data indicative of a digital map representative of the network of roads and the data indicative of the name for the road for displaying the digital map with the name for the road.

The method as described in the context of the flow chart 250 may be performed in a processing apparatus (e.g., 202; FIG. 2A) for determining road names, under control of a processor of the apparatus.

It should be appreciated that descriptions in the context of the processing apparatus 202 may correspondingly be applicable in relation to the method as described in the context of the flow chart 250, and vice versa.

There may also be provided a computer program product having instructions for implementing the method for determining road names as described herein.

There may also be provided a computer program having instructions for implementing the method for determining road names as described herein.

There may further be provided a non-transitory storage medium storing instructions, which, when executed by a processor, cause the processor to perform the method for determining road names as described herein.

The techniques disclose herein may allow, based on at least one POI associated with a road, one or more of (i) determination of a name for the road, (ii) assigning of a name for the road, (iii) detection of a name for the road, or (iv) validation or verification of a name for the road.

In the context of various embodiments, an "App" or an "application" may be installed on a user communications device and may include processor-executable instructions for execution on the device. As a non-limiting example, booking of a transport-related service may be carried out via an App.

Various embodiments may predict or suggest a road name for a road by using information corresponding to POIs that are associated with the road or the road segments making up the road.

Determination as to whether a POI is associated with a particular road or any of the road segments of the road may first be carried out. As a non-limiting example, the determination of "association" is positive if the following two conditions are satisfied:

i. the perpendicular distance of the POI to a road segment of the road is equal to or less than a defined or predetermined value (e.g., 10 meters); and ii. the orthogonal projection of the point representing the POI onto the same road segment indicated at (i) above lies on the segment.

While the terms "perpendicular" and "orthogonal" may be used interchangeably in lower dimensions, the term "orthogonal" is generally used for higher dimensions. The term "perpendicular" may provide an indication of 2 dimensions, and, therefore, may be suitably used with respect to "distance", while the term "orthogonal" is generally used in conjunction with "projections".

For condition (i) above, it should be appreciated that the defined or predetermined value may be any suitable value, for example, in a range of between about 0.5 meter and about 20 meters, between about 0.5 meter and about 15 meters, between about 0.5 meter and about 10 meters, between about 0.5 meter and about 5 meters, between about 0.5 meter and about 2 meters, between about 2 meters and about 15 meters, between about 2 meters and about 10 meters, or between about 5 meters and about 20 meters, e.g., about 0.5 meter, about 1 meter, about 2 meters, about 5 meters, about 10 meters, about 15 meters or about 20 meters. However, it should be appreciated that the defined value may even be more than 20 meters. Further, it should be appreciated that the defined value or the range of defined values may vary between areas or regions, for example, from city to city, or country to country.

For POIs where the conditions are satisfied, the street names associated with the POIs may then be obtained (e.g., from data stored in a database having data corresponding to transport-related services or ride-hailing services) for use as candidate road names. Out of the candidate road names (potentially the street names for some POIs may be different), the same candidate road name that comes up the most time may then be suggested or selected as the name for the road.

The techniques disclosed herein may further assign a confidence indicator or score to the suggested road name based on a number of parameters. Where the suggested road name has been assigned a confidence score that is greater than a threshold value, the techniques may then associate or annotate the corresponding road with the suggested road name. Where the suggested road name has been assigned a confidence score that is lower than the threshold value, further processing step(s) may be taken to verify the suggested road name for the corresponding road.

Various embodiments or techniques will now be further described in detail. As non-limiting examples, the techniques will be described in relation to OSM road attributes, including how OSM road attributes may be, for example, added, validated and/or corrected.

Various embodiments may enable road name detection from POIs.

Service providers of transport-related services may have a (large) database of POIs or points-of-interest, which may be service locations for various transport-related services such as transport, food, logistics, etc. For example, POIs may include an entrance to a large building, a house address or a vehicle parking-lot, etc.

A POI may be defined by its location in terms of its spatial coordinates, e.g., its latitude and longitude, name and address. The address field may be parsed to validate and annotate roads or ways (if missing) with street names. Generally, link ways, i.e., the ones that connect two roads or ways may not have associated names.

In some geographical areas or cities, there may be roads without a (documented) name. For example, currently of the 373995 non link ways in Jakarta, only 15.05% of the roads have street names. As such, the techniques disclosed herein may leverage POI information (e.g., held by service providers) to infer and validate street names.

The techniques may find or determine the roads represented as edges in a directed graph that are in the vicinity of a given POI. Generally, a road network may be represented as a directed graph G(V, E), where V refers to a set of nodes and E refers to a set of directed edges connecting the nodes. Two nodes may be linked by an "edge", referring to a road segment. Multiple road segments may make up a road. A node may be associated with one or more incoming edges leading to the node, and/or one or more outgoing edges leading away from the node. The network graph structure may enable identification of the number of incoming edges and/or outgoing edges.

A road on a road network graph may have 2 or more nodes. If a road has "n" nodes, the road may have "n-1" edges or segments. Each segment is generally a straight line segment. The curvature of a road, thus, may be given by multiple line segments.

Finding the nearest roads to a coordinate (e.g., associated with the POI) may be an expensive search query. To make this search for closest edges to a POI faster, in the disclosed techniques, the edges in the road network may be indexed by a Quadtree, which is a type of a tree data structure.

As a non-limiting example, a POI may be associated with a road (or road segment) if the following two conditions are met:
  i. If the perpendicular distance to any of the segments constituting the road is less than or equal to, for example, 10 meters.
  ii. If the orthogonal projection of the point representing the POI onto any of the segments constituting the road lies on the segments.

The perpendicular distance of 10 meters provided in condition (i) above is a non-limiting example, and a different distance may be used, for example, depending on the country and/or city involved.

It should be appreciated that additional condition(s) may be imposed, depending on requirement(s).

A non-limiting methodology for inferring road names (including, for example, missing road names) will now be described with reference to FIG. 3 which shows a schematic diagram 370 illustrating an example of road name suggestion/detection. The example, which will be described below, of how POIs may be used to validate and infer missing street names may be applied to any roads, streets, ways, and the like.

For the purpose of this non-limiting example, consider the OSM road or way 372 having identifier or ID of 57339172 having no associated or documented name. In this example, way 372 has 3 road segments 374a, 374b, 374c. Each road segment 374a, 374b, 374c is represented as an arrow. Each arrow may point in the direction of travel. In a digital map, a road or way may have one or more segments, where each segment may be a straight line connecting two coordinates. Thus, segments constituting a way may be chained together to give the road its curvature.

Referring to the two conditions described above and FIG. 3, POI 1 376a, being less than 10 m away from the first segment 374a of way 372, satisfies condition (i), but the orthogonal projection of POI 1 376a lies outside of the first segment 374a, thereby failing condition (ii). Hence, POI 1 376a is not considered for street name association. In other words, POI 1 376a is not an associated POI.

While POI 3 376c satisfies condition (ii) as its corresponding orthogonal projection lies on or intersects the second segment 374b of way 372, POI 3 376c fails the perpendicular distance criteria (i) of 10 meters (the dashed circle overlaid on the second road segment 374b illustrates a perpendicular distance of 10 meters, i.e., the circle has a radius of 10 meters). Hence, POI 3 376c is also not considered an associated POI for street name association.

Based on the two filtering conditions (i) and (ii), POI 2 376b, POI 4 376d, POI 5 376e and POI 6 376f are determined to be associated POIs for the road 372. As shown in FIG. 3, POI 2 376b lies within a perpendicular distance of 10 meters from the first segment 374a and its orthogonal projection lies on the first segment 374a. Similarly, POI 4 376d, POI 5 376e and POI 6 376f are within a perpendicular distance of 10 meters from the third segment 374c and their corresponding orthogonal projections intersect the third segment 374c. The street names associated with POI 2 376b, POI 4 376d, POI 5 376e and POI 6 376f may be obtained or determined from information held or stored in a database. Their corresponding street names, as indicated in FIG. 3, are, respectively Jl. Raya Tanjung Baru, Jl. Tanjungbaru Cikarang Timur, Jl. Raya Tanjung Baru, and Jl. Raya Tanjung Baru. From these names, a majority vote may be taken to determine the name for the road 372 as Jl. Raya Tanjung Baru.

The techniques disclosed herein may carry out pre-processing (e.g., a standardisation processing) for deduplicating street names from POIs. This may help to standardise certain parameters of the street names associated with POIs. Pre-processing steps for street name strings may include, but not limited to, the following. The techniques may carry out one or more pre-processing steps.

Resolving Common Abbreviations

A word in the name may be replaced with its common abbreviation. For example, the abbreviation "Jl." is a common abbreviation for the word "Jalan" in Indonesia (the English translation for the word "Jalan" in road or street), and all instances of the word "Jalan" in the street names associated with POIs may be replaced with "Jl." to remove any discrepancies. As examples, both "Jalan Raya" and "Jl. Raya" are considered as one and the same name.

In some implementations of the techniques disclosed herein, common abbreviations may be replaced with the word in full. For example, the abbreviation "Jl" and/or "Jl." may be replaced with the word "Jalan".

Resolving Equivalent Terms

A word in the name may be replaced with an equivalent term or word. The word and the equivalent term may have a similar meaning. As an example, the word "road" may be replaced with the equivalent term "street", or vice versa.

In some implementations of the techniques disclosed herein, a word in the name, in one language, may be replaced with an equivalent term or word in another language.

As a non-limiting example, the word "street" in English may be replaced with the equivalent term "Jalan" in the Indonesian language, or vice versa.

In some implementations of the techniques disclosed herein, a word in the name may be replaced with its common abbreviation, an equivalent term or word, or a common abbreviation of the equivalent term or word. A non-limiting example may include Rd.=Road=St.=Street=Ave.=Avenue=Jl.=Jalan=Bl.=boulevard.

Converting Roman Numerals to Digits

Roman numerals (e.g., I, II, V, X, etc.) are converted to their equivalent numerical digits (e.g., 1, 2, 5, 10, etc.). For example, the name "Jl. Raya IV" may be converted to "Jl. Raya 4" where both names are the same street names. All Roman numerals may thus be converted to digits. This may be achieved by regex (regular expression, which refers to search patterns done on string of characters).

Removing Punctuations in The Names

Standard punctuations such as, but not limited to, dot, comma and hyphen in POI street names may be removed. This may be achieved by standard regex. For example, the name "Jl. Raya Tanjung-Baru" may be converted to "Jl. Raya Tanjung Baru".

Truncating Names With a "No." Substring

Names with a "No." substring may be truncated by removing the "No." substring. Taking the street name "Jl. Manunggal No. 67" as a non-limiting example, the sub string "No. 67" is the door number (or house number) of the POI, and, thus, the street name from the POI may truncated to "Jl. Manunggal".

Spelling Correction

Spelling correction may be carried out as a pre-processing step (or standardisation processing). This may be done by keeping a language dictionary as a reference. Referring to FIG. 2A, the dictionary may be stored in the memory 218. Dictionaries in one or more languages may be provided. As non-limiting examples, "Jl. Tanjung Baru" may be misspelled as "Jl. Tnjung Baru" or "Jl. Tanjung Baroo" and a correction to "Jl. Tanjung Baru" may be performed.

It should be appreciated that a plurality of the pre-processing steps described above may be carried out in combination. For example, "Jl. Manunggal VII No. 67" may be converted to "Jl. Manunggal 7". As a further example, "Jalan-Manunggal VII No. 67" may be transformed to "Jl. Manunggal 7".

As further examples, where there may be additional terms when comparing two names, for example, "Jl Tanjung Baru" versus "Jl Raya Tanjung Baru", or "Jl Tanjung Baru" versus "Jl Tanjung Baru 1", these may be considered to be separate or distinct names and may not refer to the same street names. Nevertheless, the techniques disclosed herein may provide one or more options to address these, for example, by comparing the similarity between the names to determine whether they may be taken to refer to the same street names.

As yet further examples, where there may be repeated words, for example, "Jl Tanjung Baru" versus "Jl Tanjung Baru Baru", the techniques disclosed herein may provide one or more options to address this, for example, by removing one of the repeated words, if appropriate.

The techniques disclosed herein may further provide a confidence metric for the prediction of road names, for example, a confidence score or value corresponding to a suggested or candidate road name. This may enable quick annotation of roads whose names have associated high(er) confidence values while ensuring that additional step(s) may be taken, for example, manual verification or crowd sourcing, where there may be uncertainty with the suggested road names.

For the purpose or manual verification, the (automated) recommendations may go through a validation process. Street level imagery may be observed to validate a sample of the recommendations. For example, where there are 10000 suggested street names, street names may be manually looked at via imagery for a sample of, for example, 1000 (across different confidence score thresholds) to verify the accuracy of the recommendations. If the accuracy of the verified sample exceeds a certain degree of accuracy, for example, 98% accuracy, modifications at scale may then be made, such as to maps.

Where the recommended street names have low confidence scores, changes are not made to the map. Rather, road names may be crowdsourced, for example, from users of transport-related services provided or administered by service providers, including drivers and/or passengers associated with transport services, e.g., ride-hailing transport services.

As a non-limiting example, the confidence score (or confidence indicator) may be defined as below:

$$\text{confidence\_score} = \log_e(\text{max\_votes})/(1.0 + \text{entropy}) \quad \text{Equation (1)}.$$

The confidence score is directly proportional to the max_votes and inversely proportional to the entropy (e.g., Shannon's entropy).

The greater the confidence score, the more confidence there is in the street name suggested.

The parameter "max_votes" refers to the number of votes for a given or candidate street name obtained from the POIs associated with the road. Candidate street names having a confidence score of 0 may be shared for manual validation. Generally, "max_votes" should preferably be equal to or greater than 2.

As an example, "max_votes" may refer to the maximum number of votes for a candidate street name derived from the most dominant POI street name. For example, for a road with ID 123, where there may be 4 votes for "Jl. XYZ" (from 4 POIs) and 2 votes for "Jl. ABC", then, max_votes=4.

The parameter "entropy" represents the uncertainty associated with multiple candidate road names. Here, "entropy" refers to the Shannon's entropy, S, which may be as defined below:

$$S = -\sum_i p_i \log_e P_i, \quad \text{Equation (2)}$$

where $P_i$ refers to the probability of an i-th event.

Considering again the example above of 4 votes for "Jl. XYZ" and 2 votes for "Jl. ABC". The probability for "Jl. XYZ" is 4/6, while the probability for "Jl. ABC" is 2/6. Thus, the entropy may be given by applying Equation 2 above as—$([4/6 * \log_e(4/6)] + [2/6 * \log_e(2/6)])$, which results in an entropy of 0.6365.

Figure 3:
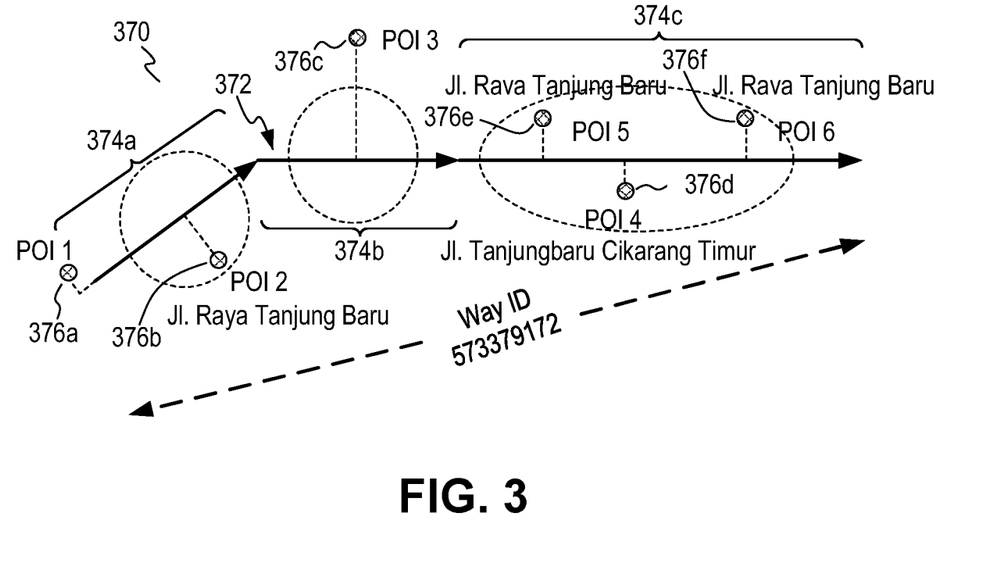
FIG. 3 shows a schematic diagram illustrating an example for road name suggestion.

For the illustrative example shown in FIG. 3, max_votes=3, corresponding to the candidate road name of "Jl. Raya Tanjung Baru". The probability for "Jl. Raya Tanjung Baru" is 3/4, while the probability for "Jl. Tanjungbaru Cikarang Timur" is ¼. Based on Equation (2), the entropy is 0.5623. Thereafter, based on Equation (1), the confidence score is 0.703. The confidence score is thus directly proportional to the max_votes and inversely proportional to the entropy.

Table 1 below shows some illustrative samples of real world confidence scores for some roads in Indonesia as non-limiting examples. The examples shown are neither most nor least confident street name suggestions. In Table 1, an "Entropy" of 0 means that there was only one candidate having exactly one vote. The acronym "NaN" stands for "not a number" which is in this case indicates "non-availability".

TABLE 1

| Way ID | Existing name on map | Max votes | Derived name from POIs | Entropy | Confidence score |
|---|---|---|---|---|---|
| 256847421 | NaN | 56 | {'Villa Tangerang Regency 2': 56} | 0.000 | 4.02 |
| 162651773 | NaN | 56 | {'Jl. Taman Besakih 1': 56} | 0.000 | 4.02 |
| 569220360 | NaN | 56 | {'Jl. Perumahan Sentraland Paradise': 56} | 0.000 | 4.02 |
| 162651787 | NaN | 56 | {'Jl. Taman Udayana 7': 56} | 0.000 | 4.02 |
| 328443218 | NaN | 96 | {'Jl. Perumahan': 96, 'Jl. Bulevard Barat Ha . . . | 0.135 | 4.01 |
| 431728043 | NaN | 86 | {'Villa Tangerang Regency 2': 86, 'Jl. Cemar . . . | 0.108 | 4.01 |
| 521187547 | JL LEMBANG I | 55 | {'Jl. Lembang 1': 55} | 0.000 | 4.00 |
| 128520670 | Jalan Pulau Penyengat III | 56 | {'Jl. Pulau Penyengat 3': 56} | 0.000 | 4.02 |
| 27945891 | Jalan Kol. Soegiono | 56 | {'Jl. Kolonel': 56} | 0.000 | 4.02 |
| 30108973 | Jalan Jelambar Selatan IV | 56 | {'Jl. Jelambar Selatan 4': 56} | 0.000 | 4.02 |

Figure 4:
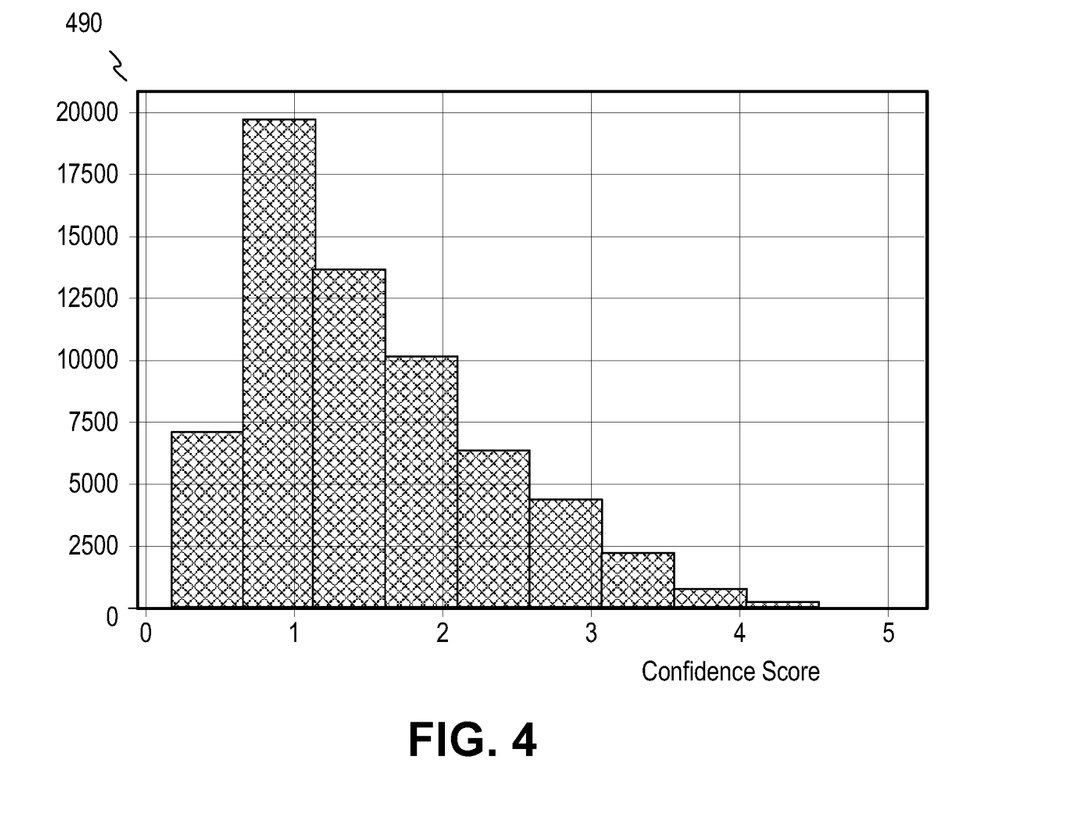
FIG. 4 shows a histogram of confidence scores for Jakarta, Indonesia.

As an example, FIG. 4 shows a histogram 490 of confidence scores of road names for the entire city of Jakarta, Indonesia.

In the techniques disclosed herein, an appropriate threshold may be defined or chosen for the parameter "confidence_score". Candidate road names having a confidence score or value above the defined threshold may be annotated on the map directly while those below the threshold may require manual intervention as mentioned above. As a non-limiting example, the appropriate threshold may be defined based on a sample of manual verification and validation of road names.

As described above, the disclosed techniques may help to increase the amount of roads having names. For example, there is a potential to increase the percentage of roads with names in Jakarta from the existing 15.05% (out of 373995 ways) to about 28.2%.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A processing apparatus for determining road names, comprising a processor and a memory, the processing apparatus being configured, under control of the processor to execute instructions in the memory to:

receive, from a map data source, map geometry data identifying a network of roads;

receive, from a point-of-interest data source, information identifying a plurality of candidate point-of-interests associated with the network of roads;

for each candidate point-of-interest of at least one candidate point-of-interest identified for association with a road in the network of roads for determining a name for the road, generate, in one or more data records, first data indicative of a first relationship relating to a distance between the candidate point-of-interest and a road segment of the road;

generate, in the one or more data records, second data indicative of a second relationship between the road segment and a projection of the candidate point-of-interest in a direction of the road segment; and if the first relationship satisfies a first condition for association and the second relationship satisfies a second condition for association, generate, in the one or more data records, data indicative of the candidate point-of-interest being an associated point-of-interest that is associated with the road;

process, for each associated point-of-interest, data corresponding to the associated point-of-interest comprising data indicative of an address of the associated point-of-interest to extract name data indicative of a road name associated with the associated point-of-interest based on the data indicative of the address;

generate, based on the name data, data indicative of the name for the road; and generate a digital map representative of the network of roads, the digital map including data indicative of the name for the road.

2. The processing apparatus as claimed in claim 1, wherein the first condition for association defines a threshold for a perpendicular distance between the candidate point-of-interest and the road segment and the first condition is satisfied if the perpendicular distance is equal to or less than the threshold; and wherein the second condition for association defines an orthogonal projection of the candidate point-of-interest in the direction of the road segment and the second condition is satisfied if the orthogonal projection intersects the road segment.

3. The processing apparatus as claimed in claim 1, wherein the at least one candidate point-of-interest comprises a plurality of candidate points-of-interest for defining a plurality of associated points-of-interest, wherein, for processing the data corresponding to the associated point-of-interest, the processing apparatus is configured to process, for each associated point-of-interest of the plurality of associated points-of-interest, respective data corresponding to the respective associated point-of-interest comprising data indicative of an address of the respective associated point-of-interest to extract name data indicative of a road name associated with the respective associated point-of-interest based on the data indicative of the address, and wherein, if the road names associated with the plurality of associated points-of-interest comprise a plurality of different candidate road names, the processing apparatus is further configured to:

determine a number count of associated points-of-interest having a candidate road name, out of the plurality of different candidate road names, that occurs the highest number of times; and for generating the data indicative of the name for the road, generate, based on the name data indicative of the candidate road name that occurs the highest number of times, data indicative of the name for the road.

4. The processing apparatus as claimed in claim 1, further configured to:

generate, in the one or more data records, data indicative of a confidence indicator for the name for the road;
compare the confidence indicator with a threshold; and
if the confidence indicator satisfies the threshold, generate data indicative of validation of the name for the road.

5. The processing apparatus as claimed in claim 4, wherein the confidence indicator is determined by the formula:

confidence indicator=log(max_votes)/(1+entropy)

where:
max_votes=number count of the associated points-of-interest having the candidate road name that occurs the highest number of times, and
entropy=Shannon's entropy representing the uncertainty associated with the plurality of candidate road names.

6. The processing apparatus as claimed in claim 1, wherein prior to processing the data corresponding to the associated point-of-interest to extract the name data, the processing apparatus is further configured to:

modify at least one part of the road name associated with the associated point-of-interest based on at least one standardisation processing; and
generate modification data indicative of the road name with the at least one modified part, the modification data being comprised in the name data, and
wherein, for processing the data corresponding to the associated point-of-interest to extract the name data, the processing apparatus is configured to process the data to extract the name data comprising the modification data.

7. The processing apparatus as claimed in claim 6, wherein the at least one standardisation processing comprises processing of abbreviations, and, for modifying the at least one part of the road name, the processing apparatus is configured to replace a non-abbreviated term in the road name with an abbreviated term corresponding to the non-abbreviated term, or replace an abbreviated term in the road name with a non-abbreviated term corresponding to the abbreviated term, or wherein the at least one standardisation processing comprises processing of punctuations, and, for modifying the at least one part of the road name, the processing apparatus is configured to remove at least one punctuation in the road name, or wherein the at least one standardisation processing comprises processing of equivalent terms, and, for modifying the at least one part of the road name, the processing apparatus is configured to replace a word in the road name with an equivalent term corresponding to the word, the word and the equivalent term having a similar meaning.

8. The processing apparatus as claimed in claim 6, wherein the at least one standardisation processing comprises processing of numbers, and, for modifying the at least one part of the road name, the processing apparatus is configured to replace a Roman numeral in the road name with a digit corresponding to the Roman numeral, or wherein the at least one standardisation processing comprises processing of number substrings, and, for modifying the at least one part of the road name, the processing apparatus is configured to remove at least one number substring in the road name, the at least one number substring comprising at least one of a house number or a unit number.

9. The processing apparatus as claimed in claim 1, wherein the processing apparatus is further configured to cause the digital map to be displayed with the data indicative of the name for the road.

10. A computer-implemented method for determining road names, the method comprising:

receiving, from a map data source, map geometry data identifying a network of roads;
receiving, from a point-of-interest data source, information identifying a plurality of candidate point-of-interests associated with the network of roads;
for each candidate point-of-interest of at least one candidate point-of-interest identified for association with a road in the network of roads for determining a name for the road,
generating, in one or more data records, first data indicative of a first relationship relating to a distance between the candidate point-of-interest and a road segment of the road;
generating, in the one or more data records, second data indicative of a second relationship between the road segment and a projection of the candidate point-of-interest in a direction of the road segment; and
if the first relationship satisfies a first condition for association and the second relationship satisfies a second condition for association, generating, in the one or more data records, data indicative of the candidate point-of-interest being an associated point-of-interest that is associated with the road;
processing, for each associated point-of-interest, data corresponding to the associated point-of-interest comprising data indicative of an address of the associated point-of-interest to extract name data indicative of a road name associated with the associated point-of-interest based on the data indicative of the address;

generating, based on the name data, data indicative of the name for the road; and generating a digital map representative of the network of roads, the digital map including data indicative of the name for the road.

11. The method as claimed in claim 10, wherein the first condition for association defines a threshold for a perpendicular distance between the candidate point-of-interest and the road segment and the first condition is satisfied if the perpendicular distance is equal to or less than the threshold; and wherein the second condition for association defines an orthogonal projection of the candidate point-of-interest in the direction of the road segment and the second condition is satisfied if the orthogonal projection intersects the road segment.

12. The method as claimed in claim 10, wherein the at least one candidate point-of-interest comprises a plurality of candidate points-of-interest for defining a plurality of associated points-of-interest, wherein processing the data corresponding to the associated point-of-interest comprises processing, for each associated point-of-interest of the plurality of associated points-of-interest, respective data corresponding to the respective associated point-of-interest comprising data indicative of an address of the respective associated point-of-interest to extract name data indicative of a road name associated with the respective associated point-of-interest based on the data indicative of the address, and wherein, if the road names associated with the plurality of associated points-of-interest comprise a plurality of different candidate road names, the method further comprises:

determining a number count of associated points-of-interest having a candidate road name, out of the plurality of different candidate road names, that occurs the highest number of times, and wherein generating the data indicative of the name for the road comprises generating, based on the name data indicative of the candidate road name that occurs the highest number of times, data indicative of the name for the road.

13. The method as claimed in claim 10, further comprising:

generating, in the one or more data records, data indicative of a confidence indicator for the name for the road;

comparing the confidence indicator with a threshold; and if the confidence indicator satisfies the threshold, generating data indicative of validation of the name for the road.

14. The method as claimed in claim 13, wherein the confidence indicator is determined by the formula:

confidence indicator=log(max_votes)/(1+entropy)

where:
max_votes=number count of the associated points-of-interest having the candidate road name that occurs the highest number of times, and entropy=Shannon's entropy representing the uncertainty associated with the plurality of candidate road names.

15. The method as claimed in claim 10, wherein prior to processing the data corresponding to the associated point-of-interest to extract the name data, the method comprises:

modifying at least one part of the road name associated with the associated point-of-interest based on at least one standardisation processing; and generating modification data indicative of the road name with the at least one modified part, the modification data being comprised in the name data, and wherein processing the data corresponding to the associated point-of-interest to extract the name data comprises processing the data to extract the name data comprising the modification data.

16. The method as claimed in claim 15, wherein the at least one standardisation processing comprises processing of abbreviations, and, wherein modifying the at least one part of the road name comprises replacing a non-abbreviated term in the road name with an abbreviated term corresponding to the non-abbreviated term, or replacing an abbreviated term in the road name with a non-abbreviated term corresponding to the abbreviated term, or wherein the at least one standardisation processing comprises processing of punctuations, and, wherein modifying the at least one part of the road name comprises removing at least one punctuation in the road name, or wherein the at least one standardisation processing comprises processing of equivalent terms, and, wherein modifying the at least one part of the road name comprises replacing a word in the road name with an equivalent term corresponding to the word, the word and the equivalent term having a similar meaning.

17. The method as claimed in claim 15, wherein the at least one standardisation processing comprises processing of numbers, and, wherein modifying the at least one part of the road name comprises replacing a Roman numeral in the road name with a digit corresponding to the Roman numeral, or wherein the at least one standardisation processing comprises processing of number substrings, and, wherein modifying the at least one part of the road name comprises removing at least one number substring in the road name, the at least one number substring comprising at least one of a house number or a unit number.

18. The method as claimed in claim 10, further comprising displaying the digital map with the name for the road.

19. A non-transitory storage medium storing instructions, which when executed by a processor cause the processor to perform a method comprising:

receiving, from a map data source, map geometry data identifying a network of roads;

receiving, from a point-of-interest data source, information identifying a plurality of candidate point-of-interests associated with the network of roads;

for each candidate point-of-interest of at least one candidate point-of-interest identified for association with a road in the network of roads for determining a name for the road, generating, in one or more data records, first data indicative of a first relationship relating to a distance between the candidate point-of-interest and a road segment of the road;

generating, in the one or more data records, second data indicative of a second relationship between the road segment and a projection of the candidate point-of-interest in a direction of the road segment; and if the first relationship satisfies a first condition for association and the second relationship satisfies a second condition for association, generating, in the one or more data records, data indicative of the candidate point-of-interest being an associated point-of-interest that is associated with the road;

processing, for each associated point-of-interest, data corresponding to the associated point-of-interest comprising data indicative of an address of the associated point-of-interest to extract name data indicative of a road name associated with the associated point-of-interest based on the data indicative of the address;

generating, based on the name data, data indicative of the name for the road; and generating a digital map representative of the network of roads, the digital map including data indicative of the name for the road.

\* \* \* \* \*